US012025086B2

(12) United States Patent
Schoefbaenker et al.

(10) Patent No.: US 12,025,086 B2
(45) Date of Patent: Jul. 2, 2024

(54) NOZZLE OF A FUEL INJECTOR AND FUEL INJECTOR HAVING SUCH A NOZZLE

(71) Applicant: LIEBHERR-COMPONENTS DEGGENDORF GMBH, Deggendorf (DE)

(72) Inventors: Norbert Schoefbaenker, Ohlsdorf (AT); Verena Koegel, Ortenburg (DE); Klaus Lichtinger, Geiselhoering (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 423 days.

(21) Appl. No.: 17/430,308

(22) PCT Filed: Feb. 6, 2020

(86) PCT No.: PCT/EP2020/052929
§ 371 (c)(1),
(2) Date: Aug. 11, 2021

(87) PCT Pub. No.: WO2020/165009
PCT Pub. Date: Aug. 20, 2020

(65) Prior Publication Data

US 2022/0145839 A1 May 12, 2022

(30) Foreign Application Priority Data

Feb. 11, 2019 (DE) ..................... 10 2019 103 329.2

(51) Int. Cl.
*F02M 61/18* (2006.01)

(52) U.S. Cl.
CPC ......... *F02M 61/18* (2013.01); *F02M 2200/03* (2013.01); *F02M 2200/803* (2013.01)

(58) Field of Classification Search
CPC ...... F02M 61/10; F02M 61/18; F02M 61/168; F02M 2200/03; F02M 2200/803; F02M 2200/16; F02M 2200/8076
(Continued)

(56) References Cited

U.S. PATENT DOCUMENTS

| | | | | |
|---|---|---|---|---|
| 7,963,464 B2 * | 6/2011 | Lewis | ................. | F02M 61/168 239/96 |
| 2009/0184185 A1 | 7/2009 | Lewis et al. | | |

FOREIGN PATENT DOCUMENTS

| | | |
|---|---|---|
| CN | 104685202 A | 6/2015 |
| DE | 102004024119 A1 | 12/2005 |

(Continued)

OTHER PUBLICATIONS

ISA European Patent Office, International Search Report Issued in Application No. PCT/EP2020/052929, May 15, 2020, WIPO, 4 pages.

*Primary Examiner* — Hai H Huynh
(74) *Attorney, Agent, or Firm* — McCoy Russell LLP

(57) ABSTRACT

The present invention relates to a nozzle of a fuel injector that comprises a pivotably symmetrical nozzle body having a hollow space for introducing a nozzle needle, a nozzle tip that is provided at one longitudinal end of the nozzle body and has openings for discharging fuel, a housing contact surface that is provided at the other longitudinal end of the nozzle body and serves the pressing at a housing of a fuel injector, and an overhang surface that is provided in the longitudinal extent of the nozzle body between the nozzle tip and the housing contact service and that serves the placement of a nozzle clamping nut. The nozzle is characterized in that the minimal distance of the pivot axis of the nozzle body from the overhang surface is smaller than the minimal distance of the pivot axis of the nozzle body from the housing contact surface.

14 Claims, 2 Drawing Sheets

Figure 1:
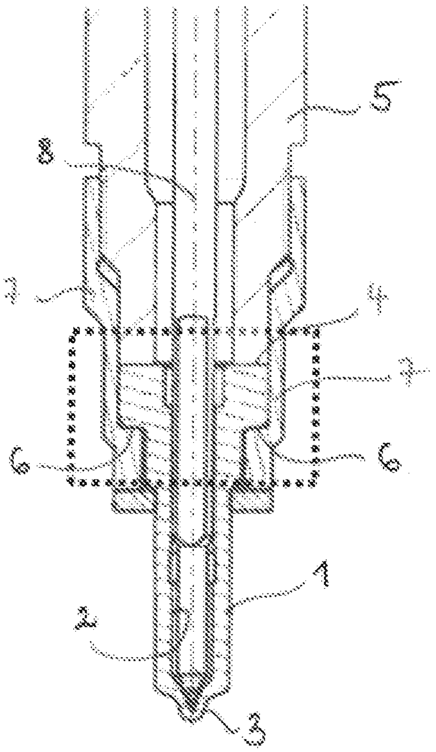
(Prior Art) Fig. 1

(58) Field of Classification Search
USPC .................................... 123/470; 239/533.12
See application file for complete search history.

(56) References Cited

FOREIGN PATENT DOCUMENTS

| | | | |
|---|---|---|---|
| EP | 2394049 | B1 | 11/2012 |
| JP | H08254169 | A | 10/1996 |
| WO | 2005008059 | A1 | 1/2005 |
| WO | 2005111407 | A1 | 11/2005 |
| WO | 2010088781 | A1 | 8/2010 |

* cited by examiner

NOZZLE OF A FUEL INJECTOR AND FUEL INJECTOR HAVING SUCH A NOZZLE

CROSS REFERENCE TO RELATED APPLICATIONS

The present application is a U.S. National Phase of International Application No. PCT/EP2020/052929 entitled "NOZZLE OF A FUEL INJECTOR, AND FUEL INJECTOR COMPRISING SUCH A NOZZLE," and filed on Feb. 6, 2020. International Application No. PCT/EP2020/052929 claims priority to German Patent Application No. 10 2019 103 329.2 filed on Feb. 11, 2019. The entire contents of each of the above-listed applications are hereby incorporated by reference for all purposes.

The present invention relates to nozzle of a fuel injector and to a fuel injector having such a nozzle.

In internal combustion engines such as diesel engines or also gasoline engines, a fuel is as a rule injected via an injector into a combustion chamber in a specific quantity and for a specific time period. It is necessary in this process due to the very small injection times that are in the microsecond range to open and close the outlet opening of the injector with a very high frequency.

Since the basic functional principle of an injector is familiar to the skilled person, some aspects that are of advantage for the understanding of the invention will only be looked at briefly in the following.

An injector typically has a nozzle needle (also: injector needle) that allows a highly compressed fuel to exit outwardly on release of a discharge hole of the injector. This nozzle needle acts in cooperation with this outlet opening as a plug that enables a discharge of the fuel when raised. It is therefore accordingly necessary to raise this needle at relatively short time intervals and to allow it to slide back into the outlet opening after a brief period.

The typical design of such a fuel injector here comprises a nozzle that has a cutout for receiving a part of the nozzle needle. An injector housing is furthermore provided in which the raising and lowering of the nozzle needle is effected. For the placement of the nozzle at the housing, both the housing and the nozzle have an abutment surface that establishes a sealing connection while exerting a sufficiently high contact pressure of the two parts. To now urge the nozzle toward the housing with a sufficiently high pressure, a nozzle clamping nut is provided as a rule that engages at an overhang surface (also called: shoulder region or shoulder) and generates the required pressure between the two abutment surfaces of the nozzle and housing by means of a threaded connection of the nozzle clamping nut and the housing.

It is disadvantageous here that due to the high required pressure tensile stresses arise in the transition region of the nozzle body toward the flange-like overhang surface that facilitate cracks and a cracking and crack progression under operating conditions in this region. Cracks (vibration corrosion) thus increasingly arise there whose occurrence is caused by the high tensile stresses on the inwardly disposed transition from the nozzle body to the overhang surface.

The high tensile stresses are furthermore also the result of a frequently spherically shaped contact surface of the nozzle and/or housing in their contact region by which a secure sealing should be ensured.

Various approaches to lower the high tensile stresses are known from the prior art. Relief grooves have, for instance, been provided in the transition region to the flange-like overhang surface or the surfaces have additionally been ground. Attempts have also been made to seal the shoulder region of the nozzle with respect to the aggressive and corrosion-promoting fuel gases.

All of these approaches, however, bring about the disadvantage that they are complex and cost-intensive.

It is therefore the object of the present invention to further develop a nozzle of a fuel injector or a fuel injector having such a nozzle such that the tensile stresses that arise in conventional nozzles are reduced without allowing the complexity and costs of the nozzle to rise.

This is done with the aid of the nozzle in accordance with the invention that has all the features of claim 1. Further advantageous embodiments are presented in the dependent claims.

The nozzle accordingly comprises a fuel injector in accordance with claim 1, a pivotably symmetrical nozzle body having a hollow space for introducing a nozzle needle, a nozzle tip that is provided at one longitudinal end of the nozzle body, and openings for discharging fuel, a housing contact surface that is provided at the other longitudinal end of the nozzle body and serves the pressing at a housing of a fuel injector, and an overhang surface that is provided in the longitudinal extent of the nozzle body between the nozzle tip and the housing contact service and that serves the placement of a nozzle clamping nut. The nozzle is characterized in that the minimal distance from the pivot axis of the nozzle body to the overhang surface is smaller than the minimal distance from the pivot axis of the nozzle body to the housing contact surface.

The force flow of the nozzle clamping nut, nozzle, and housing is deliberately transposed to the outside by this design of the nozzle so that the tensile stress in the inner transition region of the overhang surface is reduced for the placement of the nozzle clamping nut. The reduction of the tensile stress in the transition region results since the contact region between the nozzle and the housing is now arranged further outwardly than the contact region of the nozzle and the nozzle clamping nut. It is thus possible to lower the tension level to an unproblematic amount and to suppress the occurrence of cracks in this region.

Provision is made in accordance with an optional modification of the invention that the maximum distance perpendicular to the pivot axis of the nozzle body from an outer margin of the overhang surface is smaller than the maximum distance perpendicular to the pivot axis of the nozzle body from an outer margin of the housing contact surface.

This also causes the running outwardly force flow away from the pivot axis of the nozzle, which is considered advantageous, said force flow starting from the nozzle clamping nut, running through the nozzle, and being directed to the housing.

Provision can furthermore be made that an inner line of the overhang surface that defines the respective radial minimal distance of the projection surface from the pivot axis along the periphery of the nozzle has a smaller surface than an inner line of the housing contact surface that defines the respective radial minimum distance of the housing contact surface along the periphery of the nozzle.

In other words, the minimal distance of the overhang surface or of the housing contact surface is determined for every angle along the periphery of the nozzle so that a respective closing line that surrounds the pivot axis is produced for the overhang surface or the housing contact surface.

With a rotationally symmetrical nozzle, the inner line of the overhang surface or of the housing contact surface corresponds to a circle, whereas with a pivotably symmetrical nozzle, the line can, for example, correspond to a polygon or to a different pivotably symmetrical shape.

Provision can furthermore be made that the inner line of the housing contact surface completely surrounds the inner line of the overhang surface on a projection along the pivot axis. It is thereby ensured that the advantageous force flow from the inside to the outside is present at every point in the peripheral direction of the nozzle.

In accordance with a further optional modification of the nozzle, an outer line of the overhang surface that defines the respective radial distance of the pivot axis from an outer margin of the overhang surface along the periphery of the nozzle has a smaller surface than an outer line of the housing contact surface that defines the respective radial distance of the pivot axis from an outer margin of the housing contact surface along the periphery of the nozzle.

In other words, the distance of the pivot axis from an outer margin of the overhang surface or of its or the housing contact surface is determined for every angle along the periphery of the nozzle so that a respective closing line that surrounds the pivot axis. is produced for the outer margin of the overhang surface or of the housing contact surface.

It can thereby be ensured that the advantageous force flow has the desired orientation from a near region of the pivot axis in the region of the overhang surface toward a more remote region of the pivot axis in the region of the contact surface.

Provision can also preferably be made here that the outer line of the housing contact surface completely surrounds the outer line of the overhang surface on a projection along the pivot axis. The distance of the pivot axis from an outer margin of the contact surface is therefore always larger with an arbitrarily determined angle in the peripheral direction than the distance of the pivot axis from an outer margin of the overhang surface at the determined angle in the peripheral direction.

A center line of the overhang surface that centrally divides the distance from the inner line to the outer line of the overhang surface in the radial direction along the periphery of the nozzle preferably defines a smaller surface than a center line of the housing contact surface that centrally divides the distance of the inner line from the outer line of the housing contact surface in the radial direction along the periphery of the nozzle.

A center line is introduced that extends at the middle between the outer line and the inner line and that is arranged at the center of the distance of the respective points for a specific peripheral angle of the outer line and inner line.

Provision can likewise be made here that the center line of the housing contact surface completely surrounds the center line of the overhang surface on a projection along the pivot axis.

In accordance with another further development of the invention, the housing contact surface and/or the overhang surface is/are arranged perpendicular to the pivot axis of the nozzle body.

The housing contact surface and/or the overhang surface here preferably has/have the form of a circular ring. Provision can furthermore be made there that the inner diameter of the circular ring of the overhang surface is smaller than the inner diameter of the circular ring of the housing contact surface. Provision can alternatively or additionally be made that the outer diameter of the circular ring of the overhang surface is smaller than the outer diameter of the circular ring of the housing contact surface.

The advantageous further development is likewise covered by the invention according to which the nozzle is formed in one piece.

Provision can furthermore be made in accordance with the invention that the nozzle is rotationally symmetrical.

Provision is made in accordance with an optional modification of the invention that the outer diameter and/or inner diameter of the nozzle continually increases/increase transversely to the pivot axis from the tip to the housing contact surface. The cross-section of the nozzle thus continuously increases or remains the same from the nozzle tip to the housing contact surface. There may only be the case that the corresponding edge is ground in the transition to the housing contact surface so that the feature of the continuous cross-section increase is only valid up to the reaching of the housing contact surface.

The invention further relates to a fuel injector having a nozzle in accordance with one of the variants discussed above.

Provision can preferably be made here that the injector is further provided with a housing and a nozzle clamping nut, with the nozzle clamping nut being in threaded connection with the housing so that the nozzle presses the housing contact surface of the nozzle toward the housing by means of the force effect of the nozzle clamping nut on the overhang surface.

Figure 2:
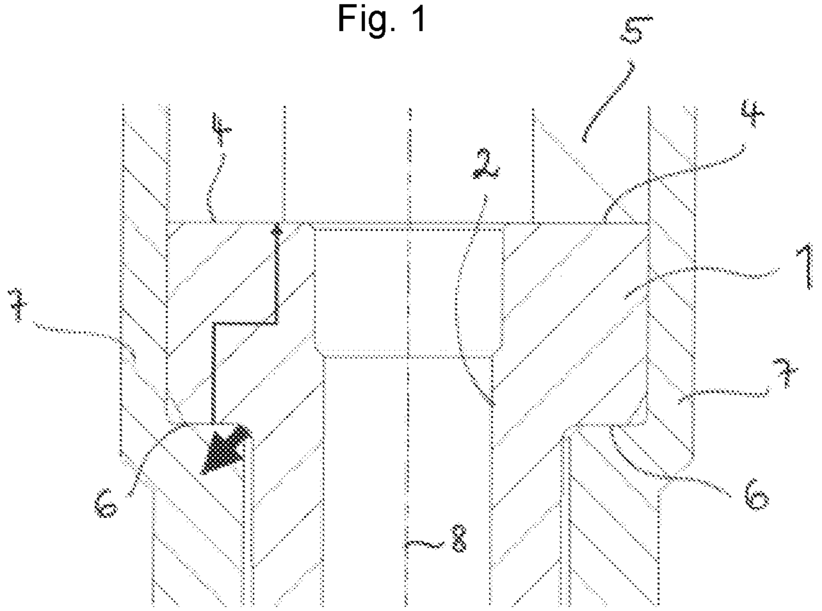
(Prior Art) Fig. 2
Figure 3:
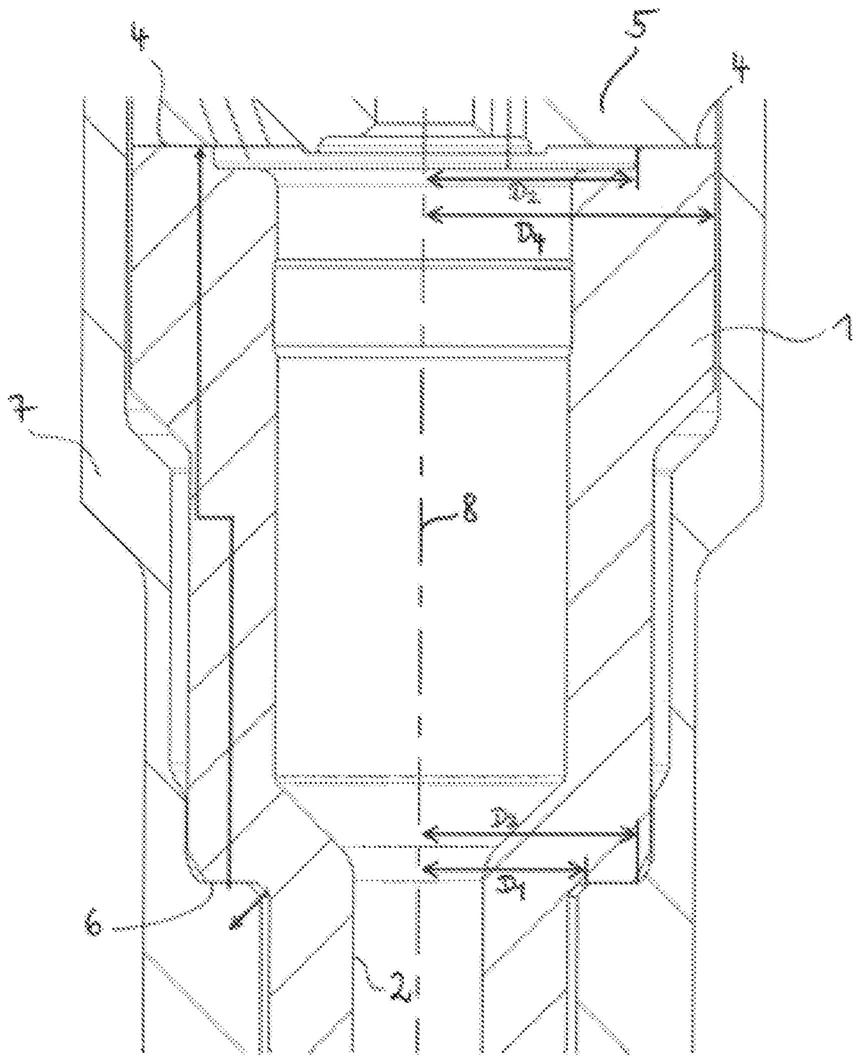

Further details, features, and advantages of the invention will be explained with reference to the following description of the Figures. There are shown:

FIG. 1: a sectional view of a part of an injector for fuel injection in accordance with the prior art;

FIG. 2: an enlarged detail around the shoulder region of the nozzle shown in FIG. 1 at which the nozzle clamping nut engages; and FIG. 3: an enlarged detail around the seat plate of an injector in accordance with the invention from different view sides;

FIG. 1 shows a sectional view of a part of an injector for injecting fuel.

The injector here comprises a housing 5 in which the nozzle needle 8 is inter alia received. The latter projects from the housing 5 and is received by the nozzle 1 in a mount 2 provided for this purpose. At its distal end, the nozzle 1 has its nozzle tip 3 that is provided with openings for discharging fuel.

To establish a sealing connection of the housing 5 and the nozzle 1, a nozzle clamping nut 7 is placed onto the nozzle 1 and is brought into engagement with a thread provided at the housing 5. The housing contact surface 4 of the nozzle 1 directed toward the housing 5 is pressed toward a corresponding surface of the housing by the threaded connection the nozzle clamping nut 7 and the housing 5 so that a sealing connection results. In this process, the nozzle clamping nut 7 presses toward the overhang surface 6 of the nozzle 1 and so presses the nozzle 1 toward the housing 5. In the drawing, the pivot axis 8 is also present or, with a rotationally symmetrical design, the axis of rotation 8.

The dotted rectangle shows the region shown enlarged in FIG. 2.

Already introduced elements are provided with the same reference numerals in FIG. 2 as in FIG. 1. The force flow originating from an application of the nozzle clamping nut is here shown by an angled arrow that extends from a more remote region of the pivot axis 8 to a closer region of the pivot axis 8. This is due to the inner margin of the housing contact surface 4 arranged closer to the pivot axis 8 with respect to the overhang surface 6 that enables the force flow shown. Such an arrangement as a result produces a large tensile stress in the transition region to the flange-like overhang or the overhang surface 6 as is symbolized by the thick arrow directly obliquely downwardly to the left in the drawing. The presence of such a high tensile stress promotes the occurrence of cracks in the shoulder region of the nozzle.

FIG. 3 now shows a nozzle 1 in accordance with the invention, with the already known elements of the nozzle 1 being provided with the same reference numerals having been used as in the preceding Figures. They will also no longer be discussed separately in the following.

Unlike the prior art, a different force flow from the nozzle clamping nut 7 via the nozzle 1 and the housing 5 is adapted due to the changed design of the housing contact surface 4. This force flow is shown by the angled arrow in FIG. 3 that extends from the overhang surface 6 to the housing contact surface 4. It can be recognized that it is now outwardly directed, on a direction of gaze from bottom to top (that is from the overhang surface 6 toward the housing contact surface 4) which has the result that the tensile stress in the transition region to the flange-like overhang or overhang surface 6 is much smaller. This is illustrated by an arrow that is narrower in comparison with FIG. 2.

The minimal distance $D_1$ of the pivot axis 8 of the nozzle body 1 from the overhang surface 6 is furthermore shown that is smaller than the minimal distance $D_2$ of the pivot axis 8 of the nozzle body 1 from the housing contact surface 4.

It can additionally also be recognized in the present embodiment that the maximum distance $D_3$ perpendicular to the pivot axis 6 of the nozzle body 1 from an outer margin of the overhang surface 6 is smaller than the maximum distance $D_4$ perpendicular to the pivot axis 8 of the nozzle body 1 from an outer margin of the housing contact surface 4. This also contributes to the desired reduction of the tensile stress in the transition region of the shoulder of the nozzle 1.

The invention claimed is:

1. A nozzle of a fuel injector comprising:
- a pivotably symmetrical nozzle body having a hollow space for introducing a nozzle needle;
- a nozzle tip that is provided at one longitudinal end of the nozzle body and has openings for discharging fuel:
- a housing contact surface that is provided at the other longitudinal end of the nozzle body and serves to press at a housing of a fuel injector; and
- an overhang surface that is provided in the longitudinal extent of the nozzle body between the nozzle tip and the housing contact surface and that serves the placement of a nozzle clamping nut, wherein the nozzle clamping nut is in face-sharing contact with radial and axial surfaces of the overhang surface,
- characterized in that
- the minimal distance ($D_1$) of the pivot axis of the nozzle body from the overhang surface is smaller than the minimal distance of the pivot axis of the nozzle body from the housing contact surface.

2. The nozzle of claim 1, wherein a maximum distance ($D_3$) perpendicular to the pivot axis of the nozzle body from an outer margin of the overhang surface is smaller than a maximum distance ($D_4$) perpendicular to the pivot axis of the nozzle body from an outer margin of the housing contact surface.

3. The nozzle of claim 1, wherein an inner line of the overhang surface that defines the respective radial minimal distance of the projection surface from the pivot axis along the periphery of the nozzle has a smaller surface than an inner line of the housing contact surface that defines the respective radial minimum distance of the housing contact surface along the periphery of the nozzle.

4. The nozzle of claim 3, wherein the inner line of the housing contact surface completely surrounds the inner line of the overhang surface on a projection along the pivot axis.

5. The nozzle of claim 3, wherein an outer line of the overhang surface that defines the respective radial distance of the pivot axis from an outer margin of the overhang surface along the circumference of the nozzle has a smaller surface than an outer line of the housing contact surface that defines the respective radial distance of the pivot axis from an outer margin of the housing contact surface along the periphery of the nozzle.

6. The nozzle of claim 5, wherein the outer line of the housing contact surface completely surrounds the outer line of the overhang surface on a projection along the pivot axis.

7. The nozzle of claim 3, wherein a center line of the overhang surface that centrally divides the distance of the inner line from the outer line of the overhang surface along the periphery of the nozzle defines a smaller surface than a center line of the housing contact surface that centrally divides the distance of the inner line from the outer line of the housing contact surface along the periphery of the nozzle.

8. The nozzle of claim 7, wherein the center line of the housing contact surface completely surrounds the center line of the overhang surface on a projection along the pivot axis.

9. The nozzle of claim 1, wherein one or more of the housing contact surface and the overhang surface is arranged perpendicular to the pivot axis of the nozzle body.

10. The nozzle of claim 1, wherein one or more of the housing contact surface and the overhang surface has the form of a circular ring.

11. The nozzle of claim 1, wherein the nozzle is formed in one piece.

12. The nozzle of claim 1, wherein the nozzle is rotationally symmetrical.

13. The nozzle of claim 1, wherein one or more of an outer diameter and an inner diameter of the nozzle continually increases transversely to the pivot axis from a tip to the housing contact surface.

14. The nozzle of claim 1, wherein the nozzle clamping nut is in threaded connection with the housing such that the nozzle presses the housing contact surface toward the housing via a force effect of the nozzle clamping nut on the overhang surface.

* * * * *